(12) United States Patent
Johnson

(10) Patent No.: US 11,352,380 B2
(45) Date of Patent: Jun. 7, 2022

(54) METHODS FOR THE PREPARATION OF PHOSPHOLIPID ENRICHED KRILL COMPOSITIONS

(71) Applicant: AVOCA LLC, Merry Hill, NC (US)

(72) Inventor: James H. Johnson, Merry Hill, NC (US)

(73) Assignee: AVOCA LLC, Merry Hill, NC (US)

( * ) Notice: Subject to any disclaimer, the term of this patent is extended or adjusted under 35 U.S.C. 154(b) by 7 days.

(21) Appl. No.: 16/499,563

(22) PCT Filed: Mar. 30, 2018

(86) PCT No.: PCT/US2018/025357
§ 371 (c)(1),
(2) Date: Sep. 30, 2019

(87) PCT Pub. No.: WO2018/183815
PCT Pub. Date: Oct. 4, 2018

(65) Prior Publication Data
US 2021/0102141 A1    Apr. 8, 2021

Related U.S. Application Data

(60) Provisional application No. 62/479,508, filed on Mar. 31, 2017.

(51) Int. Cl.
*C07F 9/10* (2006.01)
*C11B 1/10* (2006.01)
*C11B 3/00* (2006.01)

(52) U.S. Cl.
CPC .............. *C07F 9/103* (2013.01); *C11B 1/10* (2013.01); *C11B 1/104* (2013.01); *C11B 3/001* (2013.01)

(58) Field of Classification Search
CPC . C11B 3/001; C11B 3/006; C11B 1/10; C11B 1/104; B01D 11/0446; B01D 17/0217; B01D 1/222; B01D 1/00; C07F 9/103
See application file for complete search history.

(56) References Cited

U.S. PATENT DOCUMENTS

| | | | |
|---|---|---|---|
| 6,800,299 B1 | 10/2004 | Beaudoin et al. | |
| 8,030,348 B2 | 10/2011 | Sampalis | |
| 8,828,447 B2 * | 9/2014 | Soerensen | C11B 1/10 424/523 |
| 2015/0164841 A1 * | 6/2015 | Hoem | C11B 3/12 514/560 |

FOREIGN PATENT DOCUMENTS

| | | | | |
|---|---|---|---|---|
| CN | 102071101 A | * | 5/2011 | ............... C11B 1/00 |
| CN | 104498180 A | * | 4/2015 | ............. C07F 9/103 |
| CN | 104498180 A | | 4/2015 | |
| JP | 02215351 A | | 8/1990 | |
| WO | WO 2015/121381 A1 | * | 8/2015 | ........... A61K 35/612 |

OTHER PUBLICATIONS

CN 102071101 (A), Yanqing Wu et al., Method for extracting phospholipid-enriched krill oil from Antarctic Krill, English translation, 7 pages (Year: 2011).*
CN 104498180 (A), Wang Song, et al., Method for extracting high-purity phospholipid from Antarctic Krill oil, English translation, 10 pages (Year: 2015).*
International Search Report of PCT Application No. PCT/US2018/ filed on Mar. 30, 2018 and published on Oct. 4, 2018 under publication No. WO 2018/183815 A1.

* cited by examiner

*Primary Examiner* — Yate' K Cutliff
(74) *Attorney, Agent, or Firm* — William J. Davis; Nathalie Tietcheu

(57) ABSTRACT

The disclosure provides a method of obtaining an isolated phospholipid enriched krill composition. The method includes a) contacting a crude krill composition with an alcohol in an amount sufficient to provide a phospholipid enriched layer and a non-phospholipid enriched layer; b) forming a phospholipid enriched layer and a non-phospholipid enriched layer, wherein the phospholipid enriched layer is above the non-phospholipid enriched layer; c) isolating the phospholipid enriched layer and the non-phospholipid enriched layer; and d) removing the alcohol from the phospholipid enriched layer to provide an isolated phospholipid enriched krill composition.

5 Claims, No Drawings

METHODS FOR THE PREPARATION OF PHOSPHOLIPID ENRICHED KRILL COMPOSITIONS

CROSS-REFERENCE TO RELATED APPLICATIONS

This application is a U.S. National Phase filing under 35 U.S.C. § 371 of International Application No. PCT/US2018/025357, filed Mar. 30, 2018, and published as WO 2018/183815 on Oct. 4, 2018, which claims benefit of priority U.S. Provisional Patent Application No. 62/479,508 filed Mar. 31, 2017. The entire contents of each of the prior applications are incorporated herein by reference in their entirety.

BACKGROUND

Krill based phospholipid compositions have conventionally been produced by methods including supercritical carbon dioxide extraction or extraction using harsh organic solvents such as hexane, heptane, or acetone. These methods can be expensive, as specialty chemicals are involved, as well as dangerous. Furthermore, the krill compositions have low phospholipid content.

Therefore, there remains a need for improved methods to quickly, and efficiently isolate krill compositions having high phospholipid content.

SUMMARY OF THE INVENTION

The disclosure provides a method of obtaining an isolated phospholipid enriched krill composition. The method includes a) contacting a crude krill composition with an alcohol in an amount sufficient to provide a phospholipid enriched layer and a non-phospholipid enriched layer; b) forming a phospholipid enriched layer and a non-phospholipid enriched layer, wherein the phospholipid enriched layer is above the non-phospholipid enriched layer;

c) isolating the phospholipid enriched layer and the non-phospholipid enriched layer; and d) removing the alcohol from the phospholipid enriched layer to provide an isolated phospholipid enriched krill composition.

DETAILED DESCRIPTION

The present disclosure provides a process for obtaining an isolated phospholipid enriched krill composition.

A crude krill composition is contacted with an alcohol in an amount sufficient to provide a phospholipid enriched layer and a non-phospholipid enriched layer.

Krill is the common name for small, shrimp-like crustaceans that swarm in dense shoals, especially in Antarctic waters. It is one of the most important food sources (especially protein) for fish, some kinds of birds and especially for baleen whales.

Krill can be processed to form a crude krill composition. A crude krill composition includes three components: phospholipids, omega-3 fatty acids which are attached to the glycerol backbone of the phospholipids, and antioxidants, mainly astaxanthin which is responsible for the red color of the krill extract. The crude krill composition may also contain free fatty acids, triacylglycerol, diacylglycerol, monoacylglycerol, cholesterol, and proteinaceous material. The crude krill composition may be in the form of oil. In one embodiment, a crude krill composition includes krill oil. The krill oil may be obtained by any known method. For example, the krill oil may be acetone extracted krill oil, ethanol extracted krill oil, supercritical $CO_2$ extracted krill oil, or organic solvent extracted krill oil.

As used herein, a crude krill composition includes any krill derived product having less than 45% phospholipids. In one embodiment, a crude krill composition includes krill oil having less than 40% phospholipids. In one embodiment, a crude krill composition includes krill oil having less than 35% phospholipids.

A phospholipid is a molecule having two fatty acids (long chains of hydrogen and carbon molecules), joined by a glycerol head. The glycerol molecule is also attached to a phosphate group. The phosphate groups can be modified with simple organic molecules such as choline.

As used herein, phospholipids include phosphatidylcholine (PC), alkyl acyl phosphatidylcholine (AAPC), phosphatidylinositol (PI), phosphatidylserine (PS), lysophosphatidylcholine, (LPC), lyso alkyl acyl phosphatidylcholine (LAAPC), phosphatidylethanolamine (PE) alkyl acyl phosphatidylethanolamine (AAPE), cardiolipin+N-acylphosphatidylethanolamine (CL/NAPE), lysophosphatidylethanolamine (LPE), and lyso alkyl acyl phosphatidylethanolamine (LAAPE).

As used herein, the alcohol may be methanol, ethanol, any isomer of propanol or any isomer of butanol. In a preferred embodiment, the alcohol is ethanol. In one embodiment, 100% alcohol is used. In other embodiments, the alcohol is at a concentration of less than 100%, less than 95%, or less than 90%. In some embodiments, the alcohol is at a concentration of more than 80%, more than 85%, or more than 90%. In some embodiments, the alcohol is at a concentration of between about 100% and 80%, between about 100% and 90%, or between about 95% and 90%. The non-alcohol containing portion includes water.

In one embodiment, the crude krill composition is contacted with a 95% percent alcohol solution at a ratio of alcohol to crude krill composition of at least 1:1, at least 2:1, or at least 5:1.

In another embodiment, the ratio of alcohol to crude krill composition is at most 10:1, at most 15:1, or at most 20:1.

In some embodiments, alcohol and a water immiscible solvent are contacted with the crude krill composition. As used herein, a water immiscible solvent includes carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, and 2,2,4-trimethylpentane.

Upon contact of the crude krill composition with the alcohol, the resulting solution is mixed by any standard means to provide a crude krill composition/alcohol mixture. Mixing includes providing conditions that cause turbulence or shearing. Sufficient time for mixing may be readily determined by one skilled in the art.

The crude krill composition/alcohol mixture forms a phospholipid enriched layer and a non-phospholipid enriched layer. The mixture may be subject to conditions that facilitate the formation of the phospholipid enriched layer and the non-phospholipid enriched layer Conditions that provide formation of a phospholipid enriched layer and a non-phospholipid enriched layer include gravity phase separation or centrifugation. In some embodiments, the mixture will form a phospholipid enriched layer and a non-phospholipid enriched layer upon incubation at room temperature for more than 30 minutes, more than 1 hour, more than 2 hours, more than 4 hours, more than 8 hours or more than 12 hours. In another embodiment, the incubation period is no more than 12 hours or no more than 16 hours.

The mixture forms a phospholipid enriched layer and a non-phospholipid enriched layer. The phospholipid enriched layer is above the non-phospholipid enriched layer.

As used herein, "enriched" refers to a composition fraction or portion wherein an object species has been partially purified such that, on a weight basis, the concentration of the object species in the enriched composition is higher than level of the object species in the starting composition. In accordance with the present disclosure, the object species includes phospholipids, and the starting composition includes a crude krill composition.

In one embodiment, the concentration of the object species in the enriched composition is at least 1.5, at least 2, at least 3, at least 4, at least 5, at least 10, or at least 15 times higher than the object species in the non-enriched composition.

In one embodiment, the phospholipid enriched layer includes more than 45% phospholipids, more than 50% phospholipids, more than 55% phospholipids, or more than 60% phospholipids.

In a preferred embodiment, the mixture described above forms two layers, the top layer being the phospholipid enriched layer. The phospholipid enriched layer may be isolated by any known means. For example, the phospholipid enriched layer can be decanted, or drawn or suctioned by any known method to provide an isolated phospholipid enriched composition. Upon removal of solvent, alcohol, and/or water from the isolated phospholipid enriched composition, the composition includes more than 45% phospholipids, more than 50% phospholipids, more than 55% phospholipids, or more than 60% phospholipids.

Any residual alcohol in the isolated phospholipid enriched composition may be removed by conventional means, to include evaporation by rotary evaporation.

The isolated phospholipid enriched composition described herein has less than 10%, less than 1%, less than 0.1%, or less than 0.01% proteinaceous material. As used herein proteinaceous material includes proteins, peptides, and individual amino acids.

The isolated phospholipid enriched composition isolated by the method described herein provides beneficial characteristics including good flowability. As used herein, good flowability is characterized by viscosity. In some embodiments, the maximum viscosity is less than 30,000 cP, less than 20,000 cP, less than 10,000 cP, or less than 5,000 cP. In some embodiments, the minimum viscosity is at least 100 cP, at least 500 cP, or at least 1,000 cP. In some embodiments, the viscosity is between 100 cP and 30,000 cP, or between 5,000 cP and 20,000 cP.

Typical viscosity for the crude krill composition (crude krill oil) ranges from about 600-1200 cP @ 35° C. (1 cP=0.001 kg m$^{-1}$ s$^{-1}$). The viscosity of the enriched phospholipid layer has ranged from 800 to 1600 cP @ 35° C. if blended with some of the non-phospholipid enriched layer. The viscosity of the enriched phospholipid layer alone may be as high as 20,000 cP @ 35° C.

The isolated phospholipid enriched layer may be further processed to alter the concentration or additional components may be added for downstream processing.

The present disclosure provides a method of isolating a phospholipid enriched composition without the need of supercritical carbon dioxide, hexane, heptane, or other water immiscible organic solvents.

In another embodiment, the non-phospholipid enriched layer may be further processed to isolate any phospholipids contained therein. For example, the alcohol is removed from this layer and processed as described above, or combined with the isolated phospholipid enriched composition to alter the phospholipid concentration therein.

Further processing of the isolated phospholipid enriched composition may include the addition of preservatives or formulations suitable for downstream processing or products.

Preservatives and other additives may also be present such as, for example, antimicrobials, anti-oxidants, chelating agents, and inert gases and the like.

Formulations for topical administration may include ointments, lotions, creams, gels, drops, suppositories, sprays, liquids and powders. Conventional pharmaceutical carriers, aqueous, powder or oily bases, thickeners and the like may be necessary or desirable.

Compositions for oral administration include powders or granules, suspensions or solutions in water or non-aqueous media, capsules, sachets, or tablets. The use of thickeners, flavorings, diluents, emulsifiers, dispersing aids, or binders have also been contemplated and may be desirable.

Further carriers include sustained release preparations such as semipermeable matrices of solid hydrophobic polymers containing the delivery system, which matrices are in the form of shaped articles, e.g., films. It will be apparent to those persons skilled in the art that certain carriers may be more preferable depending upon, for instance, the route of administration and concentration of composition being administered.

In the specification, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Throughout this specification, quantities are defined by ranges, and by lower and upper boundaries of ranges. Each lower boundary can be combined with each upper boundary to define a range. The lower and upper boundaries should each be taken as a separate element.

Reference throughout this specification to "one embodiment," "an embodiment," "one example," or "an example" means that a particular feature, structure or characteristic described in connection with the embodiment or example is included in at least one embodiment of the present embodiments. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

In this specification, groups of various parameters containing multiple members are described. Within a group of parameters, each member may be combined with any one or more of the other members to make additional sub-groups. For example, if the members of a group are a, b, c, d, and e, additional sub-groups specifically contemplated include any one, two, three, or four of the members, e.g., a and c; a, d, and e; b, c, d, and e; etc.

Unless specified otherwise, percent composition is considered w/w percent composition.

EXAMPLES

The present invention is illustrated in further details by the following non-limiting examples:

Example 1

A total of 10.54 g of crude krill oil lot #8723-14-01-08 was added to 50 ml 190 proof ethanol and stirred for 15 minutes at room temperature. The mixture was then centrifuged at ~2,500 g force for 10 minutes which yielded two layers. The upper layer was separated by pipet and rotoevaporated to remove ethanol and water to yield 6.97 g of viscous deep red oil (JJ9-28-2A) which represented 66.1% of the starting crude krill oil. The lower layer was also rotoevaporated to remove ethanol and water to yield 3.69 g of flowable red oil (JJ9-28-2B) which represented 35.0% of the starting crude krill oil. The phospholipid content of each portion was analyzed compared to the starting crude krill oil. Results:

| Phospholipids | | 8723-14-01-08 | | JJ9-29-2A Upper Layer | | JJ9-29-2B Lower Layer | |
|---|---|---|---|---|---|---|---|
| | | wt % of total PL | g/100 g sample | wt % of total PL | g/100 g sample | wt % of total PL | g/100 g sample |
| Phosphatidylcholine | PC | 75.2 | 33.1 | 77.4 | 49.2 | 58.2 | 5.4 |
| Alkyl acyl phosphatidylcholine | AAPC | 8.2 | 3.6 | 7.9 | 5 | 3.9 | 0.4 |
| Phosphatidylinositol | PI | 1.6 | 0.7 | 1.1 | 0.7 | 4.5 | 0.4 |
| Phosphatidylserine | PS | 1 | 0.4 | 0.6 | 0.4 | 1.6 | 0.1 |
| Lysophosphatidylcholine | LPC | 3.6 | 1.6 | 3.8 | 2.4 | 2.7 | 0.3 |
| Lyso alkyl acyl phosphatidylcholine | LAAPC | 1.3 | 0.6 | 1.1 | 0.7 | 2.4 | 0.2 |
| Phosphatidylethanolamine | PE | 4.8 | 2.1 | 4.2 | 2.7 | 9.5 | 0.9 |
| Alkyl acyl phosphatidylethanolamine | AAPE | 1.5 | 0.7 | 1.3 | 0.8 | 3.7 | 0.3 |
| Cardiolipin + N-acylphosphatidylethanolamine | CL/NAPE | 2.2 | 1 | 1.9 | 1.2 | 10.6 | 1 |
| Lysophosphatidylethanolamine | LPE | 0.5 | 0.2 | 0.5 | 0.3 | 2.7 | 0.3 |
| Lyso alkyl acyl | LAAPE | 0.2 | 0.1 | 0.2 | 0.1 | <0.1 | <0.1 |
| Total Phospholipids | | | 44.1 | | 63.6 | | 9.2 |

Example 2

A total of 10.37 g or crude krill oil lot #8723-14-01-08 was added to 50 ml heptanes and 50 ml 1:1 190 proof ethanol:water (vol/vol) and stirred for 15 minutes at room temperature. The mixture was centrifuged at ~2,500 g force for 10 minutes. The top layer (heptanes layer) was separated by pipet and rotovaped to yield 9.28 grams of oil representing 89.5% of the feed oil. The bottom EtOH/water layer was discarded. The top layer oil was then stirred with 50 mL 190 proof ethanol for 15 minutes at room temperature. The mixture was then centrifuged at ~2,500 g force for 10 minutes. The upper layer (heptanes layer) was separated by pipet and rotoevaporated to yield 9.28 grams of oil representing 89.5% of the crude krill oil. The lower layer (ethanol/water layer) was discarded. The upper layer oil was then stirred with 50 mL 190 proof ethanol for 15 minutes at room temperature. The mixture was then centrifuged at ~2,500 g force for 10 minutes. The upper layer was separated by pipet and rotoevaporated to yield 5.66 grams of viscous deep red oil (JJ9-28-3B) representing 61.0% of the intermediate oil and 54.6% of the original crude krill oil. The lower layer was rotoevaporated to yield 3.34 grams of very flowable red oil (E9-28-3A) representing 36.0% of the intermediate oil and 33.2% of the original crude krill oil. The first partition removes any carbohydrate or proteinaceous material in the 1:1 ethanol:water phase before performing the second partition and increases the phospholipid level compared to Example 1 (without using the preliminary partition). The phospholipid content of each portion was analyzed compared to the starting crude krill oil.

Results:

| Phospholipids | | 8723-14-01-08 | | JJ9-29-3A Lower Layer | | JJ9-29-3B Upper Layer | |
|---|---|---|---|---|---|---|---|
| | | wt % of total PL | g/100 g sample | wt % of total PL | g/100 g sample | wt % of total PL | g/100 g sample |
| Phosphatidylcholine | PC | 75.2 | 33.1 | 56.9 | 5.6 | 77.9 | 51.1 |
| Alkyl acyl phosphatidylcholine | AAPC | 8.2 | 3.6 | 3.2 | 0.3 | 8.4 | 5.5 |
| Phosphatidylinositol | PI | 1.6 | 0.7 | 4.8 | 0.5 | 1.1 | 0.7 |
| Phosphatidylserine | PS | 1.0 | 0.4 | 1.3 | 0.1 | 0.3 | 0.2 |
| Lysophosphatidylcholine | LPC | 3.6 | 1.6 | 3.6 | 0.4 | 3.9 | 2.5 |
| Lyso alkyl acyl | LAAPC | 1.3 | 0.6 | 2.7 | 0.3 | 1.1 | 0.7 |
| Phosphatidylethanolamine | PE | 4.8 | 2.1 | 11.3 | 1.1 | 3.9 | 2.6 |
| Alkyl acyl | AAPE | 1.5 | 0.7 | 4.0 | 0.4 | 1.2 | 0.8 |
| Cardiolipin + N-acylphosphatidylethanolamine | CL/NAPE | 2.2 | 1.0 | 9.2 | 0.9 | 1.7 | 1.1 |
| Lysophosphatidylethanolamine | LPE | 0.5 | 0.2 | 3.0 | 0.3 | 0.4 | 0.2 |
| Lyso alkyl acyl | LAAPE | 0.2 | 0.1 | <0.1 | <0.1 | <0.1 | <0.1 |
| Total Phospholipids | | | 44.1 | | 9.9 | | 65.6 |

Example 3

A total of 10.26 g crude hill oil was added to 5 ml heptanes and 40 ml 190 proof ethanol and stirred for 15 minutes at room temperature. The mixture partitioned by gravity in a separatory funnel and was separated. The upper layer was rotoevaporated to yield 7.48 g of viscous deep red oil representing 72.9% of the starting crude krill oil (JJ9-28-4A). The lower layer was rotoevaporated to yield 2.48 g of very flowable red oil which represented 24.2% of the starting crude krill oil (JJ9-28-4B). This example illustrates that a second, water immiscible solvent can also be used to change the yield or characteristics of the resulting oils. The phospholipid content of each portion was analyzed compared to the starting crude krill oil.

Results:

| Phospholipids | | 8723-14-01-08 | | JJ9-29-4A Upper Layer | | JJ9-29-4B Lower Layer | |
|---|---|---|---|---|---|---|---|
| | | wt % of total PL | g/100 g sample | wt % of total PL | g/100 g sample | wt % of total PL | g/100 g sample |
| Phosphatidylcholine | PC | 75.2 | 33.1 | 75.9 | 42.6 | 60.8 | 4.8 |
| Alkyl acyl phosphatidylcholine | AAPC | 8.2 | 3.6 | 8.3 | 4.6 | 4.9 | 0.4 |
| Phosphatidylinositol | PI | 1.6 | 0.7 | 0.9 | 0.5 | 4.3 | 0.3 |
| Phosphatidylserine | PS | 1 | 0.4 | 0.9 | 0.5 | 2.9 | 0.2 |
| Lysophosphatidylcholine | LPC | 3.6 | 1.6 | 4.4 | 2.5 | 2.8 | 0.2 |
| Lyso alkyl acyl | LAAPC | 1.3 | 0.6 | 0.7 | 0.4 | 1.5 | 0.1 |
| Phosphatidylethanolamine | PE | 4.8 | 2.1 | 4.6 | 2.6 | 10.2 | 0.8 |
| Alkyl acyl | AAPE | 1.5 | 0.7 | 1.4 | 0.8 | 3.5 | 0.3 |
| Cardiolipin + N- | CL/NAPE | 2.2 | 1 | 2.1 | 1.2 | 5.9 | 0.5 |
| Lysophosphatidylethanolamine | LPE | 0.5 | 0.2 | 0.7 | 0.4 | 2.8 | 0.2 |
| Lyso alkyl acyl | LAAPE | 0.2 | 0.1 | 0.1 | 0.1 | 0.3 | <0.1 |
| Total Phospholipids | | | 44.1 | | 56.2 | | 7.9 |

Example 4

Crude krill oil lot #JJ9-84 was used as the starting material for each of the following sub-examples.

JJ9-84-1: 50.15 g of crude krill oil was added to 50 ml 190 proof ethanol.

JJ9-84-2: 50.12 g of crude krill oil was added to 100 ml 190 proof ethanol.

JJ9-84-3: 50.07 g of crude krill oil was added to 150 ml 190 proof ethanol.

JJ9-84-6: 50.96 g of crude krill oil was added to 250 ml 190 proof ethanol.

JJ11-10-2: 50.10 g crude krill oil was added to 100 ml 10% water (wt/wt) in 200 proof ethanol.

JJ11-10-3: 50.39 g crude krill oil was added to 100 ml 15% water (wt/wt) in 200 proof ethanol.

In each case the mixtures were stirred for 30 minutes at room temperature and transferred to a separatory funnel. After 1.5 hours the layers had partitioned and were separated. Each layer was subjected to rotoevaporation to remove ethanol and water to yield an oil.

Results:

| Sample | Phospholipids (g/100 g sample) | % Mass of Starting Crude Krill Oil |
|---|---|---|
| JJ9-84 Starting Crude Krill Oil | 41.9 | |
| JJ9-84-1A Phospholipid Enriched Upper Layer | 49.3 | 85.8 |
| JJ9-84-1B non-Phospholipid Enriched Lower Layer | 17.3 | 10.0 |
| JJ9-84-2A Phospholipid Enriched Upper Layer | 56.5 | 72.0 |
| JJ9-84-2B non-Phospholipid Enriched Lower Layer | 6.7 | 27.6 |
| JJ9-84-3A Phospholipid Enriched Upper Layer | 60.3 | 69.5 |
| JJ9-84-3B non-Phospholipid Enriched Lower Layer | 5.8 | 29.8 |
| JJ9-84-6A Phospholipid Enriched Upper Layer | 60.9 | 70.0 |
| JJ9-84-6B non-Phospholipid Enriched Lower Layer | 4.9 | 30.4 |
| JJ11-10-2A Phospholipid Enriched Upper Layer | 59.5 | 65.1 |
| JJ11-10-2B non-Phospholipid Enriched Lower Layer | 8.6 | 34.1 |
| JJ11-10-3A Phospholipid Enriched Upper Layer | 61.3 | 58.2 |
| JJ11-10-3B non-Phospholipid Enriched Lower Layer | 15.6 | 42.1 |

Example 5

A total of 2,476 g crude krill oil lot #8723-14-01-01 was added to 4.95 L of 190 proof ethanol and stirred for 30 minutes at room temperature and was allowed to sit overnight for the layers to partition. The layers were separated by draining the lower layer off and then draining the upper layer. A total of 65% of the lower layer by weight was added to the entire upper layer. This solution was then rotoevaporated to remove ethanol and water to yield 2,194 g of deep red flowable oil (JJ11-14-1A). The remainder of the lower layer was also rotoevaporated to remove ethanol and water to yield 266 g of bright red flowable oil (JJ11-14-1B). Each oil sample was then analyzed and compared to the starting crude krill oil.

Results:

| | Unit | 8723-14-01-01 | JJ11-14-1A, Mixed Phase | JJ11-14-1B, Lower Phase |
|---|---|---|---|---|
| Mass Yield from Feed Oil | % | | 88.6 | 10.8 |
| Peroxide Value | mEq/kg | <0.1 | 1.6 | |
| p-Anisidine | | <0.1 | <0.1 | |
| TOTOX | Calculated | | 3.3 | |
| EPA | g/100 grams | 13.4 | 15.1 | 9.0 |
| DHA | g/100 grams | 7.5 | 8.2 | 4.7 |
| Total Omega 3's | g/100 grams | 31.5 | 33.7 | 28.3 |
| EPA | Area % | 18.4 | 20.3 | 10.3 |
| DHA | Area % | 10.2 | 11.0 | 5.4 |
| Total Omega 3's | Area % | 43.1 | 45.5 | 32.4 |
| Total Phospholipids | g/100 grams | 44.5 | 48.4 | 15.7 |
| Astaxanthin equivalents | mg/Kg | 280 | 200 | 580 |
| Esterified Astaxanthin | mg/Kg | 524 | 374 | 1085 |
| TMA N | mg N/100 g | 2.5 | 0.3 | <0.05 |
| TMAO N | mg N/100 g | 54.9 | 38 | 9.5 |
| Water Activity | | 0.046 | 0.175 | |
| Viscosity | cP @ 35° C. | 800 | 1200 | |
| Total Arsenic | mg/Kg | NA | 11.1 | |
| In-Organic Arsenic | mg/Kg | <0.01 | <0.01 | |
| Cadmium | mg/Kg | <0.002 | 0.0093 | |
| Mercury | mg/Kg | <0.01 | <0.01 | |
| Lead | mg/Kg | <0.01 | <0.01 | |
| PCDD/PCDDF(WHO-TEQ) | pg/g | 0.518 | 0.840 | |
| Dioxin-like PCBs | pg/g | 0.924 | 0.802 | |
| Sum of PCBs | ng/g | | 1.19 | |
| Benzo(a)pyrene | ng/g | Non-detect | <0.393 | |
| Haze | NTU | 6.3 | 4.5 | |
| LOD | % | 0.68 | 0.28 | |
| Ethanol | % | 0.25 | ND | |

-continued

| | Unit | 8723-14-01-01 | JJ11-14-1A, Mixed Phase | JJ11-14-1B, Lower Phase |
|---|---|---|---|---|
| Vitamin A | IU/g | | 93.7 | |
| Ethoxyquin | mg/Kg | | <0.1 | |

Example 6

A total of 2705 g crude krill oil lot #8723-13-06-04 was added to 5.4 L of 190 proof ethanol and stirred for 30 minutes at room temperature and was allowed to sit overnight for the layers to partition. The layers were separated by draining the lower layer off and then draining the upper layer. A total of 50% of the lower layer by weight was added to the entire upper layer. This solution was then rotoevaporated to remove ethanol and water to yield 2,368 g of deep red flowable oil (JJ11-14-2A). The remainder of the lower layer was also rotoevaporated to remove ethanol and water to yield 407 g of bright red flowable oil (JJ11-14-2B). Each oil sample was then analyzed and compared to the starting crude krill oil.

Results:

| | Unit | 8723-13-06-04 | JJ11-14-2A, Mixed Phase | JJ11-14-2B, Lower Phase |
|---|---|---|---|---|
| Yield from Feed Oil | % | | 87.5 | 12.6 |
| Peroxide Value | mEq/kg | <0.1 | 1.9 | |
| p-Anisidine | | <0.1 | <0.1 | |
| TOTOX | Calculated | | 3.9 | |
| EPA | g/100 grams | 12.4 | 15.5 | 7.5 |
| DHA | g/100 grams | 6.2 | 7.5 | 3.2 |
| Total Omega 3's | g/100 grams | 24.8 | 29.6 | 20.3 |
| EPA | Area % | 18.4 | 20.9 | 8.4 |
| DHA | Area % | 9.3 | 10.1 | 3.6 |
| Total Omega 3's | Area % | 37.0 | 40 | 22.8 |
| Total Phospholipids | g/100 grams | 40.5 | 47.3 | 5.3 |
| Astaxanthin equivalents | mg/Kg | 170 | 200 | 430 |
| Esterified Astaxanthin | mg/Kg | 321 | 378 | 813 |
| TMA N | mg N/100 g | 3 | 0.4 | ND |
| TMAO N | mg N/100 g | 87.5 | 92 | 6.7 |
| Water Activity | | 0.165 | 0.161 | |
| Viscosity | CPS @35° C. | 800 | 2000 | |
| Microbiological | CFU/g | Non-detect | did not test | |
| Total Arsenic | mg/Kg | NA | 9.04 | |
| In-Organic Arsenic | mg/Kg | <0.009 | <0.01 | |
| Cadmium | mg/Kg | 0.0025 | 0.0035 | |
| Mercury | mg/Kg | <0.01 | <0.01 | |
| Lead | mg/Kg | <0.01 | <0.01 | |
| PCDD/PCDDF(WHO-TEQ) | pg/g | 0.549 | 0.826 | |
| Dioxin-like PCBs | pg/g | 0.245 | 0.815 | |
| Sum of PCBs | ng/g | | 0.727 | |
| Benzo(a)pyrene | ng/g | Non-detect | <0.396 | |
| Haze | NTU | 8.8 | 2.3 | |
| LOD | % | 0.60 | 0.67 | |
| Ethanol | % | <0.05 | <0.05 | |
| Vitamin A | IU/g | | 70.2 | |
| Ethoxyquin | mg/Kg | | <0.1 | |

Example 7

A total of 150.03 g crude krill oil lot #8723-14-01-01 was added to 300 ml of 190 proof ethanol and stirred for 30 minutes at room temperature and was allowed to sit overnight for the layers to partition. The layers were separated by draining the lower layer off and then draining the upper layer. The upper layer weight was 336.50 g and the lower layer weight was 55.55 g. A total of 47% or 26.1 g of the lower layer by weight was added to the entire upper layer. This solution was then rotoevaporated to remove ethanol and water to yield 124.87 g of deep red slightly viscous oil (JJ11-17-1). The remainder of the lower layer was disposed without analysis.

Results:

|  | Unit | 8723-14-01-01 | JJ11-17-1, Mixed Phase |
|---|---|---|---|
| Mass Yield from Feed Oil | % |  | 83.2 |
| EPA | g/100 grams | 13.4 | 14.0 |
| DHA | g/100 grams | 7.5 | 7.5 |
| Total Omega 3's | g/100 grams | 31.5 | 30.9 |
| EPA | Area % | 18.4 | 20.2 |
| DHA | Area % | 10.2 | 10.9 |
| Total Omega 3's | Area % | 43.1 | 44.5 |
| Total Phospholipids | g/100 grams | 44.5 | 47.2 |
| Viscosity | cP @ 35° C. | 800 | 1800 |

Example 8

A total of 150.03 g crude krill oil lot #8723-13-06-04 was added to 300 ml of 190 proof ethanol and stirred for 30 minutes at room temperature and was allowed to sit overnight for the layers to partition. The layers were separated by draining the lower layer off and then draining the upper layer. The upper layer weight was 340.93 g and the lower layer weight was 48.32 g. A total of 33% or 15.9 g of the lower layer by weight was added to the entire upper layer. This solution was then rotoevaporated to remove ethanol and water to yield 120.50 g of deep red slightly viscous oil (JJ11-17-2). The remainder of the lower layer was disposed without analysis.
Results:

|  | Unit | 8723-13-06-04 | JJ11-17-2, Mixed Phase |
|---|---|---|---|
| Yield from Feed Oil | % |  | 80.2 |
| EPA | g/100 grams | 12.4 | 14.4 |
| DHA | g/100 grams | 6.2 | 6.8 |
| Total Omega 3's | g/100 grams | 24.8 | 27.0 |
| EPA | Area % | 18.4 | 21.4 |
| DHA | Area % | 9.3 | 10.0 |
| Total Omega 3's | Area % | 37.0 | 40.1 |
| Total Phospholipids | g/100 grams | 40.5 | 49.1 |
| Viscosity | CPS @35° C. | 800 | 3000 |

Example 9

Commercial-Scale Run

A total of 665 gallons of 190 proof ethanol was added to a 1000 gallon glass-lined vessel. This was followed by the addition of 1260 kg of warm crude krill oil lot #8723-14-01-07. This mixture was then mixed for 160 minutes. The temperature at the beginning of mixing was 110° F. and 68° F. at the conclusion of the mix time. The mixture was then allowed to settle for a total of 13.67 hours. The lower layer was then drained from the vessel into a 350 gallon stainless steel tote. The weight of the lower layer was 984 pounds. The upper layer was then transferred through a micromotion meter to a stainless steel vessel. The micromotion meter was used to calculate the weight of the total upper layer which was 6162 pounds. A total of 441 pounds or 44.8% of the lower layer was added back to the entire upper layer and this mixture was mixed for 10 minutes. The mixture was then concentrated in a batch distillation system under vacuum. Concentration continued until the residual ethanol was <0.5%. A total of 1051 kg of deep red flowable oil was recovered (lot #8739-17-01).

In addition the remaining portion of lower layer was also concentrated in a like manner until the residual ethanol was <0.5%. A total of 175 kg of bright red, highly-flowable oil was obtained (lot #8740-17-01).
Results:

|  | Unit | 8723-14-01-07 | 8739-17-01, Mixed Phase | 8740-17-01, Lower Phase |
|---|---|---|---|---|
| Yield from Feed Oil | % |  | 83.4 | 13.9 |
| Peroxide Value | mEq/kg | <0.1 | <0.1 | <0.1 |
| p- Anisidine |  | <0.1 | <5 | 14 |
| TOTOX | Calculated | Not analyzed | <5 | 14 |
| EPA | g/100 grams | 12.7 | 13.8 | 7.3 |
| DHA | g/100 grams | 7.8 | 8.0 | 4.4 |
| Total Omega 3's | g/100 grams | 31.1 | 32.7 | 28.1 |
| EPA | Area % | 17.7 | 18.3 | 7.6 |
| DHA | Area % | 10.8 | 10.7 | 4.6 |
| Total Omega 3's | Area % | 43.4 | 43.6 | 29.5 |
| Total Phospholipids | g/100 grams | 44.3 | 47 | 8 |
| Astaxanthin equivalents | mg/Kg | 200 | 70 | 220 |
| Esterified Astaxanthin | mg/Kg | 374 | 131 | 411 |
| TMA N | mg N/100 g | 14 | <1.5 | <1 |
| TMAO N | mg N/100 g | 444 | <1 | <1 |
| Water Activity |  | 0.037 | 0.190 | 0.227 |
| Viscosity | CPS @35° C. | 600 | 800 | 200 |
| Microbiological | CFU/g | Non-detect | Non-detect | Non-detect |
| Total Arsenic | mg/Kg | NA | 8.9 | 3.4 |
| In-Organic Arsenic | mg/Kg | <0.01 | <0.01 | <0.01 |
| Cadmium | mg/Kg | <0.002 | 0.012 | 0.0046 |
| Mercury | mg/Kg | <0.01 | <0.01 | <0.01 |
| Lead | mg/Kg | <0.01 | <0.01 | <0.01 |
| PCDD/PCDDF (WHO-TEQ) | pg/g | 0.518 | 1.16 | 1.12 |
| Dioxin-like PCBs | pg/g | 0.924 | 1.33 | 1.01 |
| Sum of PCBs | ng/g | Not reported | 0.613 | 0.655 |
| Benzo(a)pyrene | ng/g | Non-detect | <0.761 | <0.833 |
| Haze | NTU | 3.7 | 3.6 | 4.0 |
| LOD | % | 1.24 | 1.79 | 0.00 |
| Ethanol | % | 0.23 | 0.16 | <0.05 |
| Vitamin A | IU/g | Not reported | 70.7 | 119 |
| Ethoxyquin | mg/Kg | Not reported | <0.1 | <0.1 |

While there have been described what are presently believed to be the preferred embodiments of the present invention, those skilled in the art will realize that other and further changes and modifications may be made thereto without departing from the spirit of the invention, and it is intended to claim all such modifications and changes as come within the true scope of the invention.

The invention claimed is:

1. A process for obtaining an isolated phospholipid enriched krill composition comprising at least 45% of phospholipids, the process comprising:
   a) contacting a crude krill composition with ethanol at a concentration of 95% v/v to provide a phospholipid enriched layer and a non-phospholipid enriched layer;
   b) forming a phospholipid enriched layer and a non-phospholipid enriched layer, wherein the phospholipid enriched layer is above the non-phospholipid enriched layer;

c) isolating the phospholipid enriched layer and the non-phospholipid enriched layer; and
d) removing the ethanol from the phospholipid enriched layer to provide an isolated phospholipid enriched krill composition,
e) combining the non-phospholipid enriched layer and the phospholipid enriched layer to produce a phospholipid enriched krill composition with a desired phospholipid content, wherein the ethanol may be removed after combining, wherein in step a) the ratio of ethanol to crude krill composition is at least 1:1, at least 2:1, or at least 5:1 and, wherein the process is carried out in the absence of water immiscible solvent and, wherein the maximum viscosity is less than 5,000 cP @ 35° C.

2. The process according to claim 1, wherein the crude krill composition is produced from krill by organic extraction.

3. The process according to claim 1, wherein a gravity separation or centrifuge is used in step b) to form the phospholipid enriched layer and the non-phospholipid enriched layer.

4. The process according to claim 1, in the absence of supercritical $CO_2$.

5. The process according to claim 1, wherein an evaporator is used in step d) to remove the ethanol.

* * * * *